United States Patent Office 3,769,323
Patented Oct. 30, 1973

---

3,769,323
PROCESS FOR REFINING BIS-(BETA-HYDROXY-ETHYL)TEREPHTHALATE
Yataro Ichikawa, Michiyuki Tokashiki, and Nobuo Suzuki, Iwakuni, Japan, assignors to Teijin Limited, Osaka, Japan
Continuation-in-part of application Ser. No. 786,638, Dec. 24, 1968. This application Oct. 20, 1971, Ser. No. 191,037
Claims priority, application Japan, Dec. 28, 1967, 43/84,120
Int. Cl. C07c 69/82
U.S. Cl. 260—475 PR        7 Claims

ABSTRACT OF THE DISCLOSURE

A process for the extractive purification of crude bis-(beta-hydroxyethyl)terephthalate prepared by the reaction of terephthalic acid with ethylene oxide, which comprises contacting such crude bis-(beta-hydroxyethyl) terephthalate with at least one liquid medium, which is selected from the group consisting of beta-methylnaphthalene, biphenyl beta-chloronaphthalene, carbon tetrachloride, 1,1,1-trichloroethane, tetrachloroethylene and trichloroethylene, at a temperature of 90–170° C., in such a manner that two separate phases are formed, one being a solution phase in which bis(beta-hydroxyethyl)terephthalate is dissolved in the liquid medium and the other being a melt phase which consists mainly of bis-(beta-hydroxyethyl)terephthalate and impurities contained in the starting crude bis-(beta-hydroxyethyl)terephthalate; separating the melt phase from the solution phase; and recovering refined bis - (beta - hydroxyethyl)terephthalate from the solution phase.

---

Figure 1:
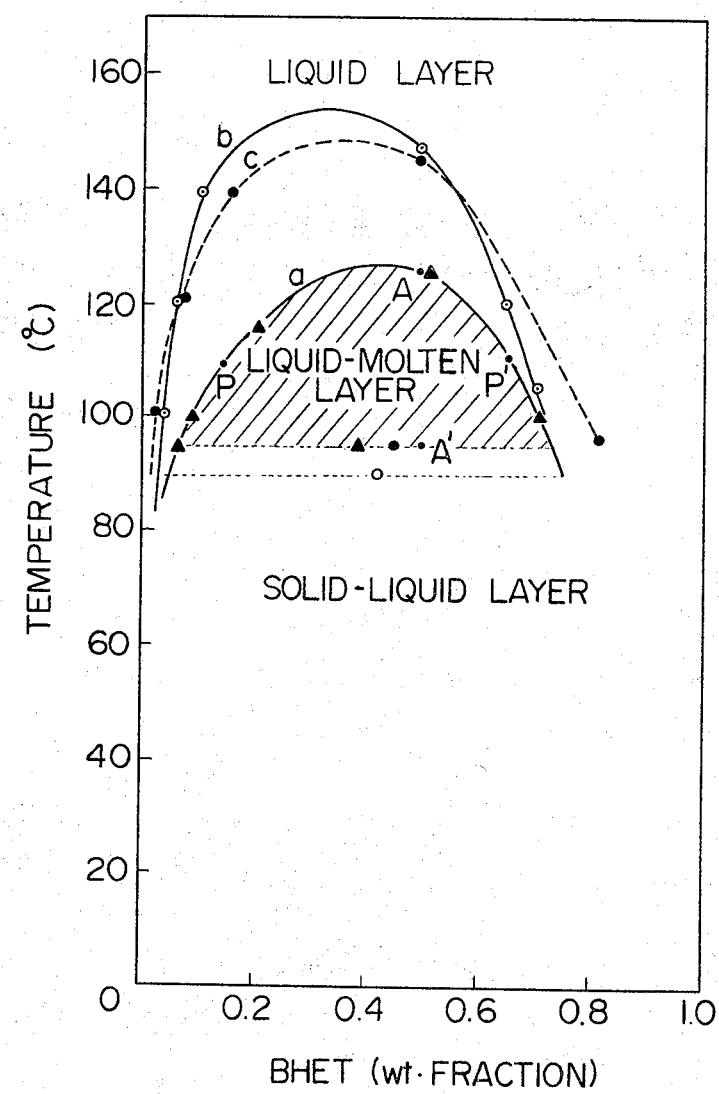

This invention relates to a process for refining bis-(beta-hydroxyethyl)terephthalate.

This is a continuation-in-part of copending application Ser. No. 786,638 filed Dec. 24, 1968.

Bis - (beta - hydroxyethyl)terephthalate (hereinafter abbreviated as BHET in this specification) has been produced in large quantities as an intermediate product in the preparation of polyethylene terephthalate, and is industrially very valuable.

As the means for making such BHET, conventionally an esterinterchange process between dimethyl terephthalate and ethylene glycol and direct esterification of terephthalic acid with ethylene glycol have been practiced. Also recently a process which is normally referred to as ethylene oxide process is drawing much attention in the field, in which terephthalic acid is directly reacted with ethylene oxide.

The crude BHET produced by the ethylene oxide process contains coloring impurities which are either carried from the starting terephthalic acid or formed during the reaction, or the impurities caused by the catalyst employed in the reaction. Therefore, when the crude BHET is polymerized without further processing, high quality polyethylene terephthalate can never be obtained.

Various proposals were made in the past concerning the purification of crude BHET. However, it was in practice difficult to obtain BHET of satisfactory purity.

As such known refining method of crude BHET obtained by the ethylene oxide process, recrystallization from various solvents may be named. The process comprises the steps of dissolving the crude BHET in the suitable solvent under conditions of heating, cooling the solution to recrystallize the BHET, and recovering the same. Known recrystallization solvents in the above process include water (U.S. Pat. No. 3,062,862), and polar organic solvents such as chlorinated hydrocarbons, alcohol, etc. (U.S. Pat. No. 3,120,560). However, these known refining methods of crude BHET by recrystallization are generally subject to such deficiencies as that the degree of purification is insufficient and/or the recovery ratio of the refined BHET is low.

Accordingly, the object of the present invention is to provide a refining process of crude BHET produced by the ethylene oxide process, whereby BHET of satisfactory purity can be obtained with high recovery ratios.

Another object of the invention is to provide a refining process of crude BHET whereby particularly the nitrogen-, phosphorus-, sulfur- or various metal-containing compounds in the BHET originating from the catalyst can be substantially completely removed by industrially easy operations.

Further objects and advantages of the invention will become apparent from the following description.

In copending application Ser. No. 786,638, we proposed a process for the extractive purification of crude bis-(beta-hydroxyethyl)terephthalate prepared by the reaction of terephthalic acid with ethylene oxide, which comprises contacting the crude bis-(beta-hydroxyethyl) terephthalate with at least one liquid medium, which is liquid at room temperature and inert to bis-(beta-hydroxyethyl)terephthalate, the liquid medium being selected from aromatic hydrocarbons and halogenated derivatives thereof, at a temperature of 90–170° C., in such a manner that two separate phases are formed, one being a solution phase in which bis-(beta-hydroxyethyl) terephthalate is dissolved in said liquid medium and the other being a melt phase which consists mainly of bis-(beta - hydroxyethyl)terephthalate and impurities contained in the starting crude bis-(beta-hydroxyethyl)terephthalate; separating the melt phase from the solution phase; and recovering refined bis-(beta-hydroxyethyl) terephthalate from the solution phase.

As a result of further research concerning the extractive purification process of the aforesaid copending application, it has been found that as the foresaid liquid medium at least one compound selected from the group consisting of beta-methyl naphthalene, biphenyl, betachloronaphthalene, carbon tetrachloride, 1,1,1-trichloroethane, tetrachloroethylene and trichloroethylene can be used with execellent results.

Hereinafter the process of the invention will be described in detail.

The composition of the crude BHET to which the present process is applied is not critical, as long as it is the reaction product of the process normally referred to as "ethylene oxide process," i.e., direct reaction of terephthalic acid with ethylene oxide. For example, the crude BHET may be that obtained by reacting optionally refined terephthalic acid with ethylene oxide in a reaction medium consisting of at least one solvent selected from water, alcohols, glycols, ketones, ethers, halogenated hydrocarbons and aromatic hydrocarbons, at the temperatures of, for example, 90°–150° C. Or, the reactants may be reacted within a similar temperature range, in the absence of such solvents.

Also we previously proposed a process of reacting terephthalic acid with ethylene oxide in an aromatic hydrocarbon solvent, at such high temperatures as 150°–250° C. for a specific period. The refining process of this invention is similarly applicable to the crude BHET obtained by the above process.

In the preparation of BHET as above described, catalysts are normally employed, the known catalysts including: primary, secondary and tertiary amines, quaternary ammonium salts and hydroxides, such as ethylamine, isopropylamine, cyclohexylamine, dimethylamine, diethylamine, di-n-butylamine, diphenylamine, N-ethyl-m-toluidine, tri-n-butylamine, morpholine, triethylamine, N,N-dimethylaniline, triethanolamine, tribenzylamine, pyridine, tetramethyl ammonium hydroxide, tetraethyl ammonium chloride, triethylbenzyl ammonium bromide, triethylbenzylammonium chloride, diethylamine hydrochloride, etc.; iron compounds such as iron (III) acetylacetonate, iron naphthanate, iron stearate and iron chloride; titanium compounds such as titanium acetylacetonate, titanium tetrabutoxide, titanium trichloride and titanium tetrachloride; tin compounds such as tin chloride; chromium compounds such as chromium benzoate, chromium stearate, chromium acetylacetonate, chromyl chloride, chromium nitrate and chromium acetate; aluminum compounds such as aluminum laurate, aluminum acetylacetonate, aluminum naphthenate, aluminum butoxide and aluminum chloride; sulfur compounds such as diethyl sulfide, di-n-butyl sulfide, diphenyl sulfide, triethylsulfonium chloride, etc; and phosphonium compounds such as triethylphosphine, tri-n-butylphosphine, triphenylphosphine and tetrabutylphosphonium bromide.

Those catalyst may be used single or in combination of two or more of the specific types.

While any crude BHET produced by the above-described ethylene oxide process in various modes of practice is usable in the invention, the subject refining process is particularly effective for removing, from the crude BHET produced in the presence of aforesaid nitrogen-, phosphorus-, sulfur- or various metal-containing catalysts, the impurities originating from the catalysts.

As to the crude BHET obtained by the reaction in the solvents as above-described, the subject refining process is applicable to the crude BHET from which the solvents have been removed after the reaction. Obviously, as to the crude BHET produced in the absence of such a solvent, the crude BHET as obtained can be treated in accordance with the invention. In both bases, the crude BHET may be recovered in the molten state and optionally solidified before carrying out the extraction purification of the present invention. In that case, the presence of unreacted terephthalic acid has no critical significance, but preferably the terephthalic acid is removed in advance.

According to the refining process of this invention, the crude BHET prepared as in the above is contacted with a compound (medium), which is selected from the group consisting of beta-methylnaphthalene, biphenyl, beta-chloronaphthalene, carbon tetrachloride, 1,1,1-trichloroethane, tetrachloroethylene and trichloroethylene, in the molten state to cause the transfer of BHET into the above mentioned medium phase.

Of the foregoing compounds which are to be used as the extraction medium in the invention extractive purification process, beta-methylnaphthalene, biphenyl and beta-chloronaphthalene are all solid compounds at room temperature. However, at the temperature conditions at which the invention extractive purification is carried out, i.e., at temperatures ranging between 90° and 170° C., they are become liquid. Incidentally, the melting points of these compounds are as follows:

| Invention extraction agent (extraction medium): | Melting point (° C.) |
| --- | --- |
| Beta-methylnaphthalene | 35.1 |
| Biphenyl | 69 |
| Beta-chloronaphthalene | 56.7 |

On the other hand, of the compounds to be used as the extraction medium in the present invention, carbon tetrachloride, 1,1,1-trichloroethane, tetrachloroethylene and trichloroethylene are all compounds which are liquid at room temperature.

The above compounds to be used as the extraction medium may be used singly or as mixtures of more than one member of the group.

In the invention, first the crude BHET obtained by the reaction of terephthalic acid with ethylene oxide is contacted with at least one of the extraction media as above-named at a temperature ranging from 90°–170° C., preferably 95°–160° C., in such a manner that two separate phases, viz, solution phase in which the BHET is dissolved in the extraction medium and melt phase consisting mainly of the BHET and impurities contained in the starting crude BHET are formed in the system.

When the crude BHET resulting from ethylene oxide process and the aforesaid extraction medium (solvent) are mutually contacted in heated state, the crude BHET is completely dissolved in the extraction medium when the quantity of the former is less than that of the latter. However, as the quantity of crude BHET is increased, a portion thereof is dissolved in the extraction medium to form a solution phase, but the rest remains undissolved, and at above certain temperature level, the undissolved crude BHET forms a melt phase which contains a small quantity of extraction medium in dissolved state. Thus in the system, two separate liquid phases of the solution phase in which a part of the crude BHET is completely dissolved in the extraction medium, and the melt phase, are formed. The contact of crude BHET with the extraction medium in accordance with the invention is performed basically in the manner as will form the two separate liquid phases of melt and solution. The "separate two liquid phases" refers not necessary to the state in which the two liquid phases are separated as upper and lower layers, but includes such a state in which either of the melt and solution phases is dispersed or suspended in the other with interfaces.

According to the invention, the solution phase, which has been formed as hereinabove described is separated from the melt phase, following which the BHET in solution in the solution phase is isolated and recovered, thus obtaining the purified BHET. Isolation and recovery of the BHET, which is in solution in the solution phase, may be accomplished by either precipitating the BHET by cooling the solution phase or evaporating the extraction medium from the solution phase. It is also possible to suitably combine these two operations.

In carrying out the precipitation of BHET from the solution phase in which it is in solution by cooling the solution, when the aromatic compounds such as beta-methylnaphthalene, biphenyl and beta-chloronaphthalene are used as the extraction medium, the BHET must be separated from these extraction media at a temperature higher than the melting points of these extraction media, since, as previously noted, the melting points of these extraction media are in all cases higher than room temperature. Needless to say, this also applies in separating the aforesaid melt phase from the solution phase.

The melting point of crude BHET varies depending on the quantity and type of the impurities contained therein, but it is normally in the order of 100°–111° C. When it is contacted with the extraction medium under heating, the extraction medium also transfers into the undissolved crude BHET, and the latter's melting point is lowered, in certain cases, to as low as approximately 90° C.

Thus in accordance with the invention, the crude BHET and the extraction medium are contacted at the temperatures ranging from 90° to 170° C., preferably 95°–160° C., in such a manner that two separate liquid phases of melt and solution are formed as above-described. Therefore, in this invention it is necessary, when the melting point of the crude BHET in contact with the extraction medium is higher than 90° C., to maintain the system at such a temperature selected with in the specified range of 90°–170° C., that the crude BHET forms a melt phase together with the extraction medium. The quantitative ratios of the crude BHET and the extraction medium and temperatures required for making such two phases can be easily empirically determined.

The reason for specifying the temperature range at the time of contacting the crude BHET with the extraction medium to be 90°–170° C., preferably 95–160° C., is because, at below 95° C., particularly below 90° C., the solubility of crude BHET in the aromatic compound is low and the process becomes economically disadvantageous. Also at above 160° C., particularly above 170° C., polymerization or coloration of the BHET takes place, and the high purity BHET can not be obtained.

When the crude BHET is contacted with the extraction medium as in the above, the impurities in the crude BHET, particularly the impurities originated from the catalysts employed in the BHET-making reaction, are far more heavily distributed into the melt phase than into the solution phase. Consequently, high purity, refined BHET can be obtained by recovering the BHET dissolved in the solution phase.

It is particularly preferred in this invention, to contact the crude BHET with the extraction medium, particularly in a main refining zone, in such a manner that the ratio between A and B should fall within the range defined by the expression below:

$$B/A \geqq 1/100$$

A being the weight part of BHET dissolved in the solution phase, and B being the weight part of BHET contained in the melt phase.

Generally, crude BHET contains impurities which are difficultly soluble in the extraction medium and have high affinity with BHET, such as, for example, the nitrogen- phosphorus-, sulfur- or various metal-containing compounds originated from the catalysts employed in the BHET production. Therefore, in the extraction of BHET from crude BHET, if the quantity of BHET to be transferred into the extraction medium is excessively increased, very large quantities of the extraction medium are required and furthermore, the ratio of the melt phase to the solution phase becomes small. Consequently the contact efficiency is lowered. Both points are economically disadvantageous. Not only that, the purity of the BHET extracted into the extraction medium is also reduced. Based upon the foregoing reasons, it is preferred to contact the crude BHET with the extraction medium at the aforesaid ratio $B/A$ of at least 1/100, the most advantageous $B/A$ ranging from 10/100–500/100.

The lower limit in the quantity of the extraction medium per unit quantity of crude BHET in the contacting of the two in accordance with the invention varies, depending on the type of the medium and temperature employed. Normally, however, it is at least 10 parts by weight per 100 parts by weight of crude BHET. For an economically advantageous recovery of purified BHET, it is desirable to employ at least 100 parts by weight of the medium based on the same quantity of crude BHET. Also the upper limit is normally $10^5$ parts, preferably $10^4$ parts of the medium per 100 parts of crude BHET, the parts being by weight.

In practicing the present invention, certain substances other than the crude BHET and the extraction medium may be present in the contacting sytsem in minor quantities. Such other compounds include water; monohydric alcohols such as methanol, ethanol and propanol; glycols such as ethylene glycol, and diethylene glycol; and inorganic or organic acids such as hydrochloric, sulfuric, phosphoric, phosphorus, nitric, acetic, propionic, and butyric acids. Among the foregoing additives, water and acids are particularly preferred. The suitable quantity of the additive or additives is no more than 10%, preferably no more than 5%, based on the extraction medium, the percentages being by weight. As a result the distribution of the impurities such as the nitrogen-phosphorus-, sulfur- or various metal-containing compounds originated from the catalysts employed in the crude BHET preparation, into the melt phase can be still further increased. Furthermore, since those additives themselves are distributed in far heavier ratios into the melt phase than into the solution phase, there is little danger of contaminating the extraction medium which is used as the solvent, or the purified BHET, with such additives.

The contact time of the crude BHET with the extraction medium in accordance with the invention is not critical, as long as it is sufficient to allow substantial extraction of BHET into the extraction medium. It is furthermore variable, depending on the manner of contacting, contact ratio and temperature, and the desired extraction effect, etc. Normally, however, it ranges from several seconds to ten hours. Generally within such contact period, little polymerization or coloration of BHET in the solution phase takes place, but the BHET in the melt phase shows a greater tendency for such objectionable phenomena, under the influence of the impurities originated from the catalysts which are concurrently present in the melt phase. Therefore, a shorter residence time in the high temperature extraction zone is preferred, particularly for the melt phase, within the feasible range.

The pressure in the system during the aforesaid contact time of crude BHET with the extraction medium is at least such that under the reaction conditions the extraction medium can retain the liquid state. Normally the pressure ranges from atmospheric to 50 kg./cm.$^2$.

In practicing the contacting operation as in the foregoing, a vapor phase portion may be optionally provided at above the contact system. If such vapor phase portion is provided, the phase is preferably filled with vapor of the extraction medium employed, or an inert gas such as nitrogen, carbon dioxide, argon, helium, etc., so as to prevent the qualitative degradation of BHET.

In practicing the contacting operation of this invention, the crude BHET to be supplied into the contact system may be either in solid or molten state. The contacting can be performed either in suspension state in which the solid, crude BHET is dispersed in the extraction medium, or in such a state that the molten crude BHET is dispersed in such medium.

Thus in accordance with the invention, the solution phase and melt phase formed by the contact of crude BHET with the extraction medium, are separated, and BHET is recovered from the solution phase, as mentioned before. As a result the purified BHET is obtained.

The separation of the solution phase from the melt phase may be performed by the gravity decantation method utilizing the difference in specific gravities of the two, or by centrifugal separation, the former method being the more preferred.

The recovery of purified BHET from the solution phase thus separated from the melt phase may be performed by isolating and recovering the purified BHET either in molten state or in solid state. The recovery can be effected by, for example, cooling the solution phase, or removing the solvent in the solution phase, i.e., the extraction medium, by evaporation. Depending on the temperature at which the purified BHET is recovered upon cooling of the solution phase or evaporation of the meduim, the BHET takes either the molten state or solid state.

When the purified BHET is separated in the molten state and present concurrently with the solution phase, it can be recovered by known means such as decantation or centrifugal separation. Also when the purified BHET is separated in the solid state, it can be recovered by known solid-liquid separation means, such as filtration, centrifugal separation, centrifugal precipitation, etc.

The subject refining process is particularly advantageous when it is applied to the crude BHET which has been obtained by the reaction of terephthalic acid with ethylene oxide, in a solvent which is the same as the extraction medium to be used in this invention. Because, since the reaction liquid in that case originally contains the crude BHET and the extraction medium, the present refining process can be successively performed in the reaction liquid as it is, or after unreacted terephthalic acid is removed therefrom. In that case, the extraction medium may be further added separately. Obviously, it is preferred to employ the identical compound with that employed in the crude BHET-making reaction, as the extraction medium.

In accordance with the refining process of the invention, the crude BHET in the molten state is contacted with the extraction medium under the conditions specified in the above, to extract and transfer the BHET into the extraction medium phase. The contact extraction between the crude BHET and the extraction medium in that case can be performed by any known batch or continuous process conventionally employed in ordinary liquid-liquid extraction.

As the batch processes, those using known agitaton type extraction vessels may be applied.

As the continuous process, processes employing such apparatuses as a mixer-settler, rotatory disc extraction column, rotatory agitation column, centrifugal extraction device, pulse column, packed column, perforated plate column, spray column, baffle plate column, etc. may be named.

Among such means of continuous operation, for example, when a mixer-settler is used, since the melt phase has a greater specific gravity than that of the solution phase, the two phases can be sufficiently contacted in the mixer zone. Thereafter at the settler zone the two phases are separated, and the melt phase is withdrawn from the lower part of the settler zone, while the solution phase is recovered from the upper portion of the same zone. Thus the two phases can be very simply separated. It is also possible to provide plural mixer zones and settler zones in series, to countercurrently contact crude BHET with the extraction medium. This countercurrent contact can be also continuously practiced, employing other apparatus as above-named. Furthermore, the continuous countercurrent contact can also be performed by combining more than one agitation tank in series.

In such continuous practices, the ratio of the weight of crude BHET contained in the melt phase B to the weight of BHET dissolved in the solution phase A, i.e., B/A, represents the weight ratio of crude BHET in the melt phase to the BHET dissolved in the solution phase flowing per unit time, at an optical section perpendicular to the direction of liquid flow in each of the extraction apparatus employed. During the actual practice of the continuous process, the ratio B/A can be determined, in both cases of countercurrent and parallel current contact, by examining the supply ratios of crude BHET and the extraction medium to the extraction apparatus, distribution equilibrium of crude BHET into the solution and melt phases under the operating conditions, and by sampling the liquid system at the optional point in the extraction apparatus and determining the composition thereof as well as the weight ratio of the solution phase to the melt phase therein.

Furthermore, it is also possible in this invention to separate a part or all of the BHET dissolved in the solution phase from that phase, preferably in the molten state, and recycling a part or all of the so-separated BHET into the extraction system. As a result the recycled BHET is again contacted with the extraction medium as the solvent, in such a manner the two liquid phases of solution and melt are formed. In such a practice, the melt phase of BHET returned to the extraction system as the recycling liquid is contacted with the solution phase in the extraction system. Consequently the impurities remained as dissolved in the solution phase are transferred into the melt phase of the recycled BHET. Thus, refined BHET of still higher purity, viz., containing less impurities, can be recovered from the solution phase.

The purpose of recycling the BHET which is dissolved in the solution phase as separated from the extraction system, is first that the BHET needs to be separated from the solution phase. The separation can be effected by evaporating a part or all of the extraction medium in the solution phase in which the BHET is dissolved, or by cooling the solution phase to precipitate a part of the BHET. Either of the above methods is satisfactory for practical purpose, When the additive or additives such as water, monohydric alcohols, glycols and acids are added to the extraction system, the location of their supply is not critical. Whereas, if the above-described recycling is practiced, it is preferred to effect the addition of the additive or additives to the BHET separated from the solution phase which has been withdrawn from the extraction system, before the BHET is recycled into the same system.

Again, when the extraction operation of the invention is practiced as a continuous process, the places of supplying the extraction medium and crude BHET are not limited to a fixed point, but they may be each supplied from plural entrances. Also the temperature within the extraction system is not necessarily maintained uniform at all locations.

Thus in accordance with the invention, high purity BHET from which the impurities such as nitrogen-, phosphorus-, sulfur- or metal-containing compounds originating from the catalysts used in the crude BHET-making reaction are substantially completely eliminated, can be obtained from crude BHET produced by the reaction of terephthalic acid with ethylene oxide, by industrially practicable easy operations, at very high recovery ratios.

Further, as shown in the accompanying drawings, the solvent power relative to the crude BHET at the temperatures 90–170° C., temperatures at which the invention extractive purification is carried out, of the extraction media used in the invention is highly suitable for forming the aforesaid two phases, i.e., solution phase and melt phase.

The accompanying drawing of FIG. 1 is a phase-equilibrium diagram of several examples of the extraction media used in the invention and BHET; curves $a$, $b$ and $c$ showing the phase-equilibrium curves of respectively beta-methylnaphthalene and BHET, 1,1,1-trichloroethane and BHET and trichloroethylene and BHET, the ordinate of the graph being temperature (° C.) and the abscissa of the graph being the weight fraction of BHET which is calculated as follows:

$$\text{weight fraction of BHET} = \frac{\text{BHET}}{\text{BHET} + \text{extraction solvent}}$$

For example, if this diagram is explained with reference being made to curve $a$, in a system in which the weight fraction of BHET is 0.5, i.e., BHET and beta-methylnaphthalene are contained in an equal weight, the point A represents the temperature (about 125° C.) at which BHET forms a saturated solution in beta-methylnaphthalene. Therefore, in a system in which the weight fraction of BHET is 0.5, a homogeneous solution is formed if the temperature of the system is higher than this point A. On the other hand, when the temperature of the foregoing system falls below point A, two phases are formed, one being a beta-methylnaphthalene solution of BHET and the other being molten BHET (herein, as previously noted, are contained the various impurities that are contained in the starting crude BHET and the beta-methylnaphthalene, the extraction solvent) i.e. the two phases, a solution phase and a melt phase, are formed. These two phases, the solution and melt phases, are formed in the temperature zone lying between points A and A' of the above system. In the temperature zone below point A', the two phases, one a beta-methylnaphthalene solution of BHET and the other a solid phase of BHET, i.e. a solution and a solid phase are formed.

In the present invention the extractive purification and the separation of the melt phase from the solution phase are carried out in the zone in which the two phases of solution and melt are formed, i.e. with reference to curve $a$ of FIG. 1 these operations are carried out in the temperature zone and the BHET weight fraction zone defined by the crosshatching.

Thus, when, for example, the extractive purification of BHET of a weight fraction of 0.5 is carried out at, for example, 110° C. in a system in which phase equilibrium is indicated by the aforesaid curve $a$, the weight fraction of BHET in the solution phase will fall at about point P, while the weight fraction of BHET in the melt phase will fall at about point P'.

On the other hand, in the case of compounds analogous to the extraction medium used in the invention, for example, such compounds as naphthalene, 1,1,2-trichloroethane, bromabenzene, methylene chloride, ethylene chloride, chloroform, 1,1,1,2-tetrachloroethane, anisole, 1,4-dioxane, cyclohexanone, and acetophenone, it is either impossible or extremely difficult to form the solution phase and melt phase as in the case where the hereinbefore described extraction solvents, as used in the invention, are used, because the solubility of BHET in the foregoing solvents at a temperature below the apparent melting point of BHET is too great.

Figure 2:
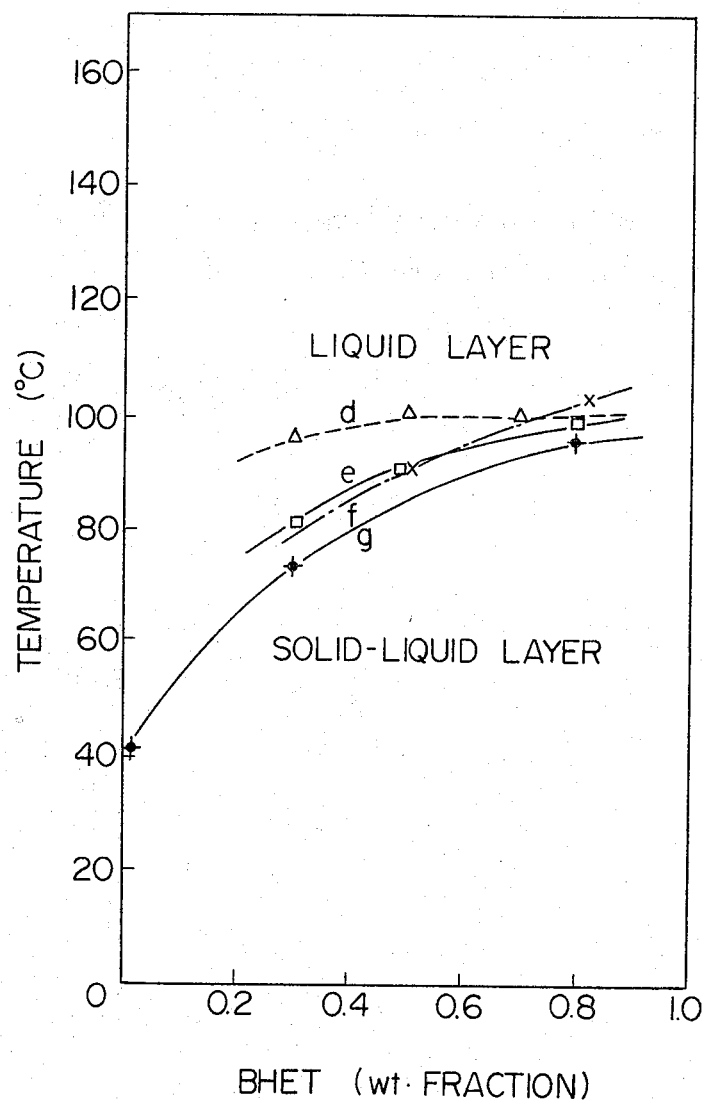

FIG. 2 shown by way of comparison the respective phase-equilibrium curves in the cases of naphthalene and BHET, 1,1,2-trichloroethane and BHET, bromobenzene and BHET, and methylene chloride and BHET (the curves being designated $d$, $e$, $f$ and $g$, respectively).

As can be seen from these curves, $d$, $e$, $f$ and $g$, the solubility behavior of these solvents differs completely from those of the extraction solvents which are used in this invention. The two phases, i.e., the aforesaid solution phase and melt phase, do not form in the appropriate BHET weight fraction zone, and therefore only a homogenous solution phase or the two phases of a solution and solid are formed.

On the other hand, in the case of such solvents as, for example, cyclohexane and normal hexane, the solubility of BHET in these solvents is two small. Therefore, if it is desired to carry out the operation economically with these solvents, an elevated temperature in excess of 200° C. must be employed. As a result, degradation of the quality of BHET takes place, such as the oligomerization and discoloration of BHET. On the other hand, the solubility of BHET in water, alcohols and glycols, which have been hitherto used as recrystallization solvents of BHET, is too great, with the consequence that the substantial formation of the aforesaid two liquid phases is impossible, thus making these solvents unsuitable for use as the invention extraction media.

The eight compounds hereinbefore specified as being used as extraction media in the invention are, as previously noted, suited for the formation of a solution phase and a melt phase. Further, these compounds, as previously indicated, have the advantage that their property of dissolving impurities is small. As is apparent from the accompanying drawings, relatively large amounts of purified BHET can be obtained by cooling the solution phase from 90–170° C., the temperature at which the extractive purification of the invention is performed.

Therefore, when the melt phase is separated from the solution phase at a temperature ranging 90–170° C., and preferably 95–160° C., temperatures at which the invention extractive purification is carried out, the various impurities contained is the starting crude BHET and especially the impurities which are attributable to the various catalysts that are used in preparing the BHET, are separated from the solution in a form in which they are contained in the melt phase. Further, the solvent power of the extraction media used in the invention is relatively great relative to BHET in the temperature zone at which the invention extractive purification is carried out. Therefore, there is the advantage that purified BHET can be obtained in a great amount by submitting the solution phase after separation of the melt, to either cooling and/or a treatment consisting of evaporating the extraction medium therefrom.

Of the aforesaid seven extraction media that are used in the invention, the aliphatic halides, i.e. carbon tetrachloride, 1,1,1-trichloroethane, tetrachloroethylene and trichloroethylene are more suitable than the three media of the aromatic type. The reason why the aliphatic halides are preferred is because of their possession of such advantages as their usually greater recovery of purified BHET, the ease of recovery of the extraction medium because of their lower boiling point, and their lesser fire hazard in view of their flame retardant property.

The BHET thus purified in accordance with the subject extraction refining process provides high quality polyesters when polymerized as it is. Or, the BHET may be further subjected to other known refining processes to provide refined BHET of even higher purity.

Hereinafter the invention will be explained in further detail, with reference to the working examples and controls in which all parts are by weight, unless otherwise specified.

Also the optical density, O.D., referred to in the examples was measured, to 1.5 g. of the test sample as dissolved in pyridine to make 50 ml. of solution, which was placed in 5-cm. long cell, at the wave length of 340 m$\mu$. The N-content was measured by the Kjeldahl method.

EXAMPLE I 83 parts of crude terephthalic acid, 430 parts of benzene, 44 parts of ethylene oxide, 0.25 part of triethylamine and 0.80 part of aluminum butoxide are charged to a condenser equipped autoclave. After purging the autoclave with nitrogen, nitrogen is introduced to a pressure of 10 kg./cm.$^2$ gauge and the mixture is heated for 10 minutes at 180° C. with stirring. This is followed by evaporating and cooling the mixture down to 130° C. while regulating the operation by opening the valve at the top of the condenser to ensure that benzene does not overflow. At this time, 6.0 parts of ethylene oxide are recovered from the spent gas.

Next, the autoclave is pressured with nitrogen, and the mixture is delivered under pressure to a pressured filter maintained at 130° C. to separate the unreacted terephthalic acid that is in suspension in the reaction mixture. The resulting liquid is then water-cooled to room temperature, followed by separation of the benzene and drying to obtain a crude bis-(beta-hydroxyethyl)terephthalate (BHET).

Fifteen parts of crude BHET and 100 parts of tetrachloroethylene are charged to a sight glass equipped pressure vessel. After purging the vessel with nitrogen, nitrogen is introduced to a pressure of 5 kg./cm.$^2$ gauge and the mixture is stirred for 5 minutes at 170° C.

The stirring is then stopped, and the mixture is allowed to stand for 5 minutes, whereupon the mixture phase, i.e., the solution phase, is then charged as such to an agitation tank of glass filled in advance with tetrachloroethylene and maintained at 50° C. and 55 mm. Hg abs., where it is cooled rapidly. The BHET crystallizing out is separated from the solution and dried and, as a result, 10.7 parts of white purified BHET are obtained.

The separated upper layer solution phase is removed externally of the system and dried. When the weight of this dried matter was determined it was 4.2 parts.

The analysis results are shown below. The $B/A$ ratio was 39.3/100.

| Class of BHET | O.D. | N content (p.p.m.) | Al content (p.p.m.) |
|---|---|---|---|
| Starting crude BHET | 0.802 | 230 | 610 |
| BHET crystallized from solution | 0.110 | 4.5 | (1) |
| Melt phase BHET | >2.0 | 804.5 | 2,164 |

[1] Not detected.

The analysis for Al was conducted by the fluorescent X-ray method.

EXAMPLE II

A slurry consisting of 83 parts of terephthalic acid obtained by the air oxidation of p-xylene in an acetic acid solvent in the presence of a cobalt catalyst, 44 parts of ethylene oxide, 0.5 part of triethylamine and 288 parts of benzene is continuously introduced to a tubular reactor immersed in high pressure water of 170° C., where the reaction is carried out by causing the slurry to dwell therein for 8 minutes under a pressure of 40 kg./cm.² gauge. The reaction mixture is then introduced to a reaction product receptacle coupled to the remote end of the tubular reactor and cooled to 120° C. under a pressure identical to that of the reaction. This is followed by intermittently introducing the reaction mixture to obtain a slurry of 20° C. The so obtained slurry is then filtered under pressure to thereby separate BHET from the mother liquor, after which the BHET is dried under reduced pressure.

The rate of reaction of terephthalic acid in the above-described reaction was 86.9%.

The dried BHET is melted by heating at 120° C. in an atmosphere of $N_2$, following which the molten BHET is filtered under pressure to separate the unreacted terephthalic acid and obtain the crude BHET. The optical density (O.D.) of this crude BHET was 0.182, its N content was 695 p.p.m., and its Co metal content was 112 p.p.m.

Next, an extraction apparatus made up of a recovery section consisting of a three-stage mixer-settler and a refining section consisting of an eight-stage mixer-settler is used, and carbon tetrachloride preheated to 140° C. is continuously introduced to the foregoing apparatus starting from the first stage at the rate of 100 parts per hour. On the other hand, the crude BHET prepared as hereinabove described is preheated to 140° C. and continuously fed at the rate of 4.4 parts per hour into the third-stage mixer.

107.2 parts per hour of a solution phase are withdrawn from the eleventh stage, which is the final stage of the refining section. This withdrawn solution phase is continuously introduced into an agitation tank equipped with a reflux condenser containing carbon tetrachloride, thereby causing BHET to crystallize out, after which the solution phase was withdrawn externally of the system and a solid-liquid separation operation was carried out, followed by washing the BHET crystals in cold carbon tetrachloride and vacuum drying the crystals to obtain 7.3 parts per hour of purified BHET. Of the so obtained purified BHET, 3.7 parts per hour thereof are melted by raising the temperature up to 140° C. and then continuously fed to the eleventh stage mixer, the final stage of the refining section of the extraction apparatus, where a melt phase is formed, which is then continuously contacted countercurrently with the solution phase in the refining section.

On the other hand, in the recovery section, the melt phase predominantly of crude BHET from which BHET has been extracted and in which the impurities have been concentrated is withdrawn externally of the system from the first stage settler at the rate of 0.8 part per hour. The so withdrawn BHET is submitted to vacuum drying and crude BHET in which the impurities have been concentrated is obtained at the rate of 0.7 part per hour.

At the point where the foregoing operations have attained a steady state, samplings are taken from the several settlers and analyzed. The rates of flow of BHET and toluene in the several tanks, the B/A ratio and the N content in the samples obtained from the several settlers are measured. These values on the basis of dry BHET of each phase are shown below.

| Tank number | Amount of solution phase flow (parts/unit time) | | Amount of melt phase flow (parts/unit time) | | B/A | N content in cake (p.p.m.) | |
|---|---|---|---|---|---|---|---|
| | Carbon tetrachloride | BHET | Carbon tetrachloride | BHET | | Melt phase | Solution phase |
| 1 | 100.1 | 0.7 | 0.1 | 0.7 | 100/100 | 4,700 | 98 |
| 2 | 100.2 | 2.1 | 0.2 | 1.3 | 62/100 | 1,960 | 70 |
| 3 | 100.3 | 6.6 | 0.4 | 3.3 | 50/100 | 821 | 50 |
| 4 | 100.3 | 7.4 | 0.5 | 3.6 | 49/100 | 100 | 11.2 |
| 5 | 100.1 | 7.5 | 0.5 | 3.7 | 49/100 | 30 | 5.7 |
| 6 | 100.2 | 7.4 | 0.5 | 3.7 | 50/100 | 15 | 3.9 |
| 7 | 100.2 | 7.4 | 0.5 | 3.7 | 50/100 | 5.2 | 40 |
| 8 | 100.3 | 7.5 | 0.5 | 3.7 | 49/100 | 5.0 | 3.9 |
| 9 | 100.2 | 7.5 | 0.5 | 3.7 | 49/100 | 4.6 | 3.2 |
| 10 | 100.3 | 7.5 | 0.6 | 3.7 | 49/100 | 4.4 | 2.2 |
| 11 | 99.9 | 7.4 | 0.5 | 3.7 | 50/100 | 4.2 | 2.0 |

Further, the Co metal content of the dried BHET of the melt phase and the purified BHET were 703 and 0 p.p.m., respectively.

The optical density of the purified BHET obtained by operating as hereinabove described is 0.034 and its N content is 2 p.p.m.

The so obtained BHET and 0.30 mol percent thereof of antimony trioxide are placed in a flash and, after thorough purging of the flask with $H_2$, heated at 285° C. After treating for 30 minutes at normal pressure, the internal pressure of the flask is gradually reduced to 1 mm. Hg 30 minutes later. Then the mixture is polymerized for a further 60 minutes under high vacuum, after which the vacuum is destroyed by introducing nitrogen into the flask. The properties of the resulting polymer are as indicated below, thus showing that its quality is good.

$[\eta]$ ---------------------- 0.672.
S.P. ---------------------- 263.0° C.
Color -------------------- L=84.5, a=−0.9, b=−4.0
[COOH] ----------------- 14.5 e.g./$10^6$ g.

The $[\eta]$ is the intrinsic viscosity of the polyester as measured at 35° C. using orthochlorophenol as the solvent; S.P. is the softening point of the polyester; and the charatcers L, a and b are the readings of a color-difference meter is accordance with the method of indication of ASTM 1482–57 T.

EXAMPLE III 23 parts of crude BHET of O.D. 0.532 and Cr content of 1250 p.p.m., obtained by reacting terephthalic acid and ethylene oxide using chromium naphthenate as the catalyst, followed by separation and removal of the unreacted terephthalic acid, and 100 parts of trichloroethylene were charged to a vessel identical to that used in Example I, and the experiment was operated at 140° C. as in Example I. The lower layered solution phase was gradually cooled to room temperature, whereupon was crystallized out BHET, which was separated and dried. 19.1 parts of purified BHET was thus obtained. The results obtained are shown below. The B/A ratio was 15/100.

| Class of BHET | Optical density | Cr content (p.p.m.) |
|---|---|---|
| BHET recovered from the solution phase | 0.098 | 3.5 |
| BHET in the melt phase | >2.0 | 9,200 |

Further, when the upper layered melt phase was withdrawn, dried and its weight was determined, it was 3.0 parts. The Cr content was gravitatively analyzed by the atomic absorption method.

EXAMPLE IV 22 parts of crude BHET (Fe content of 731 p.p.m., unreacted terephthalic acid content of 5.2 weight percent, and O.D. 0.731) made by reacting terephthalic acid and ethylene oxide in the presence of iron (III) acetylacetonate as the catalyst and 100 parts of 1,1,1-trichloroethane are charged to a vessel identical to that used in Example I. After purging the vessel with nitrogen, nitrogen is introduced to a pressure of 2 kg./cm.² gauge and the mixture is heated to 154° C. After stirring the mixture for 15 minutes, it is allowed to stand still for 10 minutes. Since the unreacted terephthalic acid settles to the lower melt phase, the melt phase is withdrawn from the bottom of the vessel. The upper solution phase is allowed to stand until it cools to room temperature and BHET crystallizes out, which is then separated and dried to thus obtain purified BHET in an amount of 19.8 parts. The melt phase, on drying, amounted to 2.0 parts. The $B/A$ ratio was 10/100.

| Class of BHET | Optical density | Fe content (p.p.m.) |
|---|---|---|
| Purified BHET recovered from solution phase | 0.112 | 7.6 |
| Melt phase residue | >2.0 | 7,970 |

The Fe content was determined by the atomic absorption method.

EXAMPLE V 83 parts of crude terephthalic acid, 500 parts of toluene, 44 parts of ethylene oxide and 0.5 part of triethylamine were charged to an autoclave and, after purging the autoclave with nitrogen, the autoclave was pressured to 20 kg./cm.² gauge with nitrogen, following which the mixture was heated for 30 minutes at 160° C. with stirring.

This was followed by evaporation and cooling of the mixture by opening and regulating the valve at the top of the condenser so as to prevent the toluene from overflowing. Next, the autoclave was pressured with nitrogen, and the reaction mixture was introduced to a pressured filter, where the unreacted terephthalic acid was separated, after which the resulting mixture was cooled to room temperature and a solid-solution separation operation was caried out, thus obtaining BHET.

25 parts of the so obtained BHET and 100 parts of beta-methylnaphthalene were charged to a sight glass equipped stainless steel agitation tank, where, after purging the tank with nitrogen, the mixture was heated to 110° C. and stirred for 15 minutes. The stirring was then stopped and the mixture was allowed to stand for 15 minutes to accomplish the separation of the mixture into two liquid phases. The bottom layered melt phase was then withdrawn externally of the system and the top layered solution phase was allowed to gradually cool in situ to 50° C. at which temperature BHET crystallized out, which BHET was separated, washed thoroughly in benzene and dried, whereupon was obtained white purified BHET in an amount of 18.5 parts. This purified BHET had an optical density of 0.131 and its N content was 32.1 p.p.m., while the N content of the BHET in the melt phase was 2270 p.p.m. By way of comparison, the starting crude BHET had an optical density of 0.425 and its N content was 480 p.p.m. The optical density of the melt phase BHET could not be measured, it being above 2.0.

Further, when the polymer contents of the crude BHET and purified BHET were measured by the liquid chromatographic method, they were 0.5% weight and 2.3% by weight, respectively.

EXAMPLE VI 83 parts of crude terephthalic acid, 200 parts of benzene, 44 parts of ethylene oxide and as the catalyst 1.31 parts of triphenylphosphine were charged to an autoclave. After purging the autoclave with nitrogen, it was pressured to 10 kg./cm.² gauge with nitrogen, after which the mixture was stirred for 10 minutes at 180° C. Next, the mixture was rapidly cooled to room temperature and a solid-liquid separation operation was carried out, after which the solids portion was heat-melted and passed through a filter maintained at 120° C. to thereby separate the unreacted terephthalic acid and obtain crude BHET whose phosphorus content was 1400 p.p.m. and optical density was 0.615.

Twenty parts of the so obtained crude BHET and 100 parts of biphenyl were charged to a pressure bottle of glass and, after purging the bottle with nitrogen, heated at 120° C. with stirring. The stirring was then stopped, and the upper and lower layers were taken in separate vessels. The upper layered solution phase was cooled to cause crystallization of BHET at 80° C., after which the BHET crystals were separated from the solvent and washed in n-hexane. As a result white BHET was recovered in an amount of 9.6 parts. The optical density of the so obtained BHET was 0.101 and its phosphorus content was 3.5 p.p.m. When the melt phase, which amounted to 8.1 parts, was submitted to gas chromatography at room temperature and the biphenyl content was measured, it was 38.3 weight percent. When the phosphorus content was measured in this state, it was 3490 p.p.m. On the other hand, no phosphorus could be detected in the crystallized BHET.

The $B/A$ ratio was 33.3/100 and the recovery of crystallized BHET relative to solution phase BHET was 80.6% by weight.

The quantitation of phosphorus was conducted by the fluorescent X-ray method.

EXAMPLE VII

Twenty parts of crude BHET prepared as in Example V and 100 parts of beta-chloronaphthalene were charged to a glass vessel and, while passing therethrough a small quantity of nitrogen, heated at 130° C. with stirring. After stirring for 20 minutes, the mixture was allowed to stand, whereupon the mixture separated into two liquid phases. The lower layered melt phase was withdrawn, while the upper layered solution phase was gradually cooled to 65° C. to crystallize out BHET. The BHET crystals were then separated from the solvent, thoroughly washed in cyclohexane and thereafter dried. 10.7 parts of BHET were obtained, the properties of which are shown in the following table. No N was detectable in the filtrate from which the crystallized BHET was separated.

Optical density _____ 0.117
N content _____p.p.m__ 4.9

The recovery of the crystallized BHET relative to the solution phase was 82.1% by weight. Further, when the melt phase was analyzed by means of gas chromatography, 98.1% by weight was BHET which, when converted to weight, was 7.1 parts. The $B/A$ ratio was 54.0/100.

Controls I and II

Twenty parts of the crude BHET prepared in Example V and 100 parts of the medium indicated in the following table were charged to a 200-cc. pressure bottle of glass and, after purging the bottle with nitrogen, the temperature was raised up to 85° C. with stirring. The crystals of the crude BHET completely dissolved in the medium without passing through the molten state.

Next, the solution was gradually cooled to room temperature, after which the crystallized BHET was separated, washed in the same medium as hereinbefore used, and thereafter dried. The analysis results are as follows:

| Control | Class medium used | O.D. of crystallized BHET | N content of crystallized BHET (p.p.m.) |
|---|---|---|---|
| I | Methylene chloride | 0.422 | 480 |
| II | Chloroform | 0.475 | 416 |

Controls III and IV 21 parts of the crude BHET prepared in Example V and 98 parts of the medium indicated in the following table were charged to a 200-cc. pressure bottle of glass and, after purging the bottle with nitrogen, the temperature of the mixture was raised up to 80° C. with stirring. The crystals of the BHET charged completely dissolved without passing through the molten stage. This was followed by gradually cooling the solution to room temperature (there was no appearance of molten matter during this time). The crystallized BHET was separated, washed in the same medium as used hereinbefore and dried. The analysis results of the crystallized BHET are shown in the following table. The color of the crystallized BHET was yellow.

| Control | Class medium used | O.D. of crystallized BHET | N content of crystallized BHET (p.p.m.) |
|---|---|---|---|
| III | Anisole | 0.366 | 475 |
| IV | 1,4-dioxane | 0.395 | 481 |

Controls V and VI 23 parts of the crude BHET prepared in Examples III and I and 100 parts of the respective media indicated in the following table were conjointly used as indicated therein. BHET obtained by operating exactly as in Controls I and II was yellow in color and analyzed as shown in the following table. The crude BHET in either case dissolved in the medium without passing through the molten state; and also when the solutions were gradually cooled, crystals were separated out in both cases with no separation of molten matter.

| Control | Class of— Medium used | Class of— Crude BHET used | O.D. of crystallized BHET | Content of crystallized BHET (p.p.m.) | Method content of crystallized BHET (p.p.m.) |
|---|---|---|---|---|---|
| V | Ethylene chloride | Crude BHET prepared in Ex. III | 0.577 | | Cr: 1,192 |
| VI | 1,1,1,2-tetrachloroethane | Crude BHET prepared in Ex. I | 0.811 | 230 | Al: 607 |

Control VII

Thirty parts of the crude BHET prepared in Example V and 70 parts of naphthalene were charged to a pressure bottle of glass and after purging the bottle with nitrogen, the temperature was raised at the rate of 2° C. per minute. The naphthalene started to melt at 81° C., but the crude BHET was still solid. When the temperature rose to 95° C., a part of the crude BHET was still solid, but the rest became mixed with the naphthalene and was in a molten state. When the temperature was raised still higher, the solid portion of the crude BHET disappeared at 96.1° C. and all the contents was melted, and a homogeneous phase was formed. Next, when heating was discontinued and the mixture was allowed to cool gradually, the temperature fell to 82° C. while the mixture retained its homogeneous phase intact and suddenly the whole mixture was crystallized.

Thus, it was impossible to obtain the BHET and naphthalene separately.

Control VIII

Fifty parts of the crude BHET prepared in Example V and 50 parts of bromobenzene were placed in a 100-cc. pressure bottle of glass and, after purging the bottle with nitrogen, the pressure was built up to 1 kg./cm.$^2$ gauge with nitrogen and the temperature was raised. The BHET became completely dissolved in the medium at 98° C. Next, when the solution was gradually cooled, crystals of BHET separated out at 68.8° C. without the formation of a molten matter. The BHET and the filtrate were then separated, after BHET wetted by the bromobenzene was raised further to 150° C. to melt the BHET. Then nitrogen was blown in at a pressure of 100 mm. Hg abs. to effect the melt-drying of the BHET followed by cooling to obtain dried BHET. The analysis results are as follows:

Optical density of crystallized BHET _____ 0.450
N content of crystallized BHET _____p.p.m__ 476

Controls IX and X

Twenty parts of the crude BHET prepared in Examples V and VI and 100 parts of the respective media indicated in the following table were in each case placed in a flask and, after purging the flask with nitrogen, heated for 10 minutes at 80° C. with stirring. The crude crystalline BHET was completely dissolved in the medium. This was followed by gradually cooling the solution to room temperature to crystallize out BHET, which was then separated and dried. When the BHET obtained was analyzed, the results were as follows:

| Control | Class of— Medium used | Class of— Crude BHET used | O.D. of crystallized BHET | Synthesizing catalyst contained in BHET (p.p.m.) |
|---|---|---|---|---|
| IX | Cyclohexanone | Crude BHET prepared in Ex. VI | 0.601 | P: 1,372 |
| X | Acetophenone | Crude BHET prepared in Ex. V | 0.400 | N: 439 |

Controls IX and X

A stirrer-equipped stainless steel autoclave having a sight glass in its midsection was charged with 14 parts of the crude BHET prepared in Example V and 100 parts of n-hexane. Then, after purging the autoclave with nitrogen, nitrogen was introduced to a pressure of 1 kg./cm.$^2$ gauge and the mixture was heated up to 200° C. with stirring. The stirring was continued for a further 5 minutes at this temperature and then the stirring was stopped and the mixture was allowed to stand for 10 minutes. This was followed by withdrawing the lower layered melt phase externally of the system while watching the proceeding through the sight glass in the midsection of the autoclave. The upper layered solution phase was then gradually cooled to room temperature to crystallize out BHET, which was separated, washed further in n-hexane, and dried. As a result crystallized BHET was obtained in an amount of 6.9 parts, the analysis results of which are shown in the following table. The B/A ratio was 100/100. Further, when the weight of the melt phase was determined after drying, it was 7.0 parts.

On the other hand, when the experiment was carried out by operating in exactly the same manner as described above, excepting that cyclohexane was used instead of n-hexane, the BHET crystallized from the solution phase amounted to 8.2 parts, while the melt phase amounted to 5.7 parts. The B/A ratio was 68.8/100. The analysis results in this case are also shown in the following table.

|  |  | Optical density | | N content (p.p.m.) | | |
|---|---|---|---|---|---|---|
| Control | Class of medium used | BHET crystallized from solution phase | Melt phase BHET | BHET crystallized from solution phase | Melt phase BHET | Oligomer content of crystallized BHET (p.p.m.) |
| XI | n-Hexane | 0.152 | 1.2 | 29.4 | 931 | 13.2 |
| XII | Cyclohexane | 0.141 | 1.1 | 31.0 | 1,134 | 20.2 |

NOTE.—The oligomer content of the crystallized BHET was analyzed by the liquid chromatography method.

EXAMPLE VIII

Fifteen parts of the crude BHET prepared in Example V and 90 parts of trichloroethylene were charged to a pressure vessel of the same type as used in Example I and, after purging the vessel with nitrogen, nitrogen was introduced to a pressure of 1 kg./cm.$^2$ gauge and the mixture was heated for 10 minutes at 135° C. with stirring. The stirring was then discontinued and the mixture was allowed to stand for 10 minutes, whereupon separation into two layers took place. The lower layered solution phase was poured into trichloroethylene to cause the crystallization of BHET, which crystallized BHET was separated at the same temperature. The melt phase contained in the vessel, after having been withdrawn, was dried. When the weight was determined, it was found to be 5.0 parts.

The crystallized BHET obtained and trichloroethylene were charged at exactly the same proportion as hereinbefore described and the same operations were repeated. By repeating the foregoing procedure twice, purified BHET was obtained. The purified BHET obtained in this manner was white, and the polymer obtained by polymerizing this BHET as in Example II had a satisfactory color tone.

Optical density of purified BHET _____ 0.062
N content of purified BHET _____p.p.m__ 2.5

Property values of polymer:
[η] _____ 0.670
L _____ 88.4
a _____ −0.8
b _____ −3.5
Softening point _____° C__ 262.8
[COOH] _____ 14.2

We claim:
1. A process for the extractive purification of crude bis-(beta-hydroxyethyl)terephthalate prepared by the reaction of terephthalic acid with ethylene oxide, which comprises contacting said crude bis-(beta-hydroxyethyl)terephthalate with at least one liquid medium selected from the group consisting of beta-methylnaphthalene, biphenyl, beta-chloronaphthalene, carbon tetrachloride, 1,1,1-trichloroethane, tetrachloroethylene and trichloroethylene, at a temperature of 90–170° C., in such a manner that two separate phases are formed, one being a solution phase in which bis-(beta-hydroxyethyethyl)terephthalate is dissolved in said liquid medium and the other being a melt phase which consists mainly of bis-(beta-hydroxyethyl) terephthalate and impurities contained in the starting crude bis-(beta-hydroxyethyl) terephthalate; separating the melt phase from the solution phase; and recovering refined bis-(beta-hydroxyethyl) terephthalate from the solution phase.

2. The process of claim 1 wherein the crude bis-(beta-hydroxyethyl)terephthalate is contacted with said liquid medium at a temperature of 95–160° C.

3. The process of claim 1 wherein said crude bis-(beta-hydroxyethyl)terephthalate is contacted with said liquid medium in the presence of not more than 10% by weight, based on the weight of said liquid medium, of water or an inorganic or organic acid.

4. The process of claim 1 wherein the crude bis-(beta-hydroxyethyl)terephthalate is contacted continuously with said liquid medium countercurrently.

5. The process of claim 1, wherein the crude bis-(beta-hydroxyethyl)terephthalate is contacted with said liquid medium at the ratio of B to A falling within the expression:

$$B/A \geq 1/100$$

wherein A is the weight part of the bis-(beta-hydroxyethyl)terephthalate dissolved in the solution phase and B is the weight part of the bis-(beta-hydroxyethyl)terephthalate and impurities contained in the melt phase.

6. The process of claim 5 wherein said ratio of B to A is within the range of 10/100–500/100.

7. The process of claim 1 wherein said liquid medium is selected from carbon tetrachloride, 1,1,1 - trichloroethane, tetrachloroethylene, and trichloroethylene.

References Cited

UNITED STATES PATENTS

| 3,600,430 | 8/1971 | Martin et al. | 260—475 |
| 3,548,031 | 6/1971 | Martin et al. | 260—475 P |
| 3,668,235 | 6/1972 | Ichikawa | 260—475 P |

LORRAINE A. WEINBERGER, Primary Examiner
E. J. SKELLY, Assistant Examiner